United States Patent
Hatlelid et al.

(10) Patent No.: US 7,631,356 B2
(45) Date of Patent: Dec. 8, 2009

(54) SYSTEM AND METHOD FOR FOREIGN CODE DETECTION

(75) Inventors: Kristjan R. Hatlelid, Sammamish, WA (US); Uri London, Redmond, WA (US); Vladimir A. Shubin, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/102,341

(22) Filed: Apr. 8, 2005

(65) Prior Publication Data

US 2006/0230388 A1  Oct. 12, 2006

(51) Int. Cl.
G06F 21/00 (2006.01)

(52) U.S. Cl. .......................................... 726/24; 717/127
(58) Field of Classification Search ............. 726/22–25; 717/127
See application file for complete search history.

(56) References Cited

U.S. PATENT DOCUMENTS

| | | | | |
|---|---|---|---|---|
| 5,103,394 | A * | 4/1992 | Blasciak | 714/47 |
| 7,093,239 | B1 * | 8/2006 | van der Made | 717/135 |
| 2004/0255163 | A1 * | 12/2004 | Swimmer et al. | 713/201 |
| 2005/0066354 | A1 * | 3/2005 | Dellow et al. | 725/30 |
| 2006/0265749 | A1 * | 11/2006 | Kwon et al. | 726/24 |

FOREIGN PATENT DOCUMENTS

WO  WO 2004/090733  10/2004

OTHER PUBLICATIONS

Pietrek, Matt. Under the Hood, Aug. 1996, Microsoft Systems Journal. http://www.microsoft.com/msj/archive/s402.aspx.*
Pietrek, Matt. Under the Hood. Nov. 1996. Microsoft Systems Journal. http://www.microsoft.com/msj/archive/S2058.aspx.*

* cited by examiner

*Primary Examiner*—Gilberto Barron, Jr.
*Assistant Examiner*—Simon Kanaan
(74) *Attorney, Agent, or Firm*—Woodcock Washburn LLP

(57) ABSTRACT

A method and system for efficient foreign code detection is presented. In one aspect of the invention, an authentication module examines pages which are referenced by thread stacks in a process space, where the pages may contain foreign code. The module can walk up the thread stacks to examine return address that reference such pages. In another aspect, the module checks random pages referenced by the stack. In yet another aspect, the module checks any nearby suspicious pages to checked pages referenced by the stack. Additionally, the module checks the instruction pointer referenced page, the pages and calling code described by the page fault history, and any pages with event handling functions, dynamic link library functions, or other functions that are likely to run.

17 Claims, 9 Drawing Sheets

SYSTEM AND METHOD FOR FOREIGN CODE DETECTION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2004, Microsoft Corp.

CROSS-REFERENCE TO RELATED APPLICATIONS

This application relates to U.S. patent application Ser. No. 11/156,126, filed Jun. 17 2005 and U.S. patent application Ser. No. 11/086,961, filed Mar. 21, 2005.

FIELD OF THE INVENTION

The present invention relates generally to the field of computing. More particularly, the present invention relates to techniques of detecting foreign code that is not intended to reside in a computer system's process space.

BACKGROUND OF THE INVENTION

Computer systems today are subject to a variety of attacks that can disrupt or disable expected operation of a computer system and cause the system to behave in damaging or undesirable ways. Computer viruses, worms, and trojan horse programs are examples of different forms of attack. Attacks can also come from unscrupulous users of a computer system or remote hackers. Often these attacks take the form of attempts to modify existing program code executed by the computer system or attempts to inject new unauthorized program code at various stages of normal program execution within the computer system. Systems and methods for preventing such malicious attacks are becoming increasingly important.

Generally speaking, such attacks are implemented by causing the computer to execute foreign code. "Foreign" code, in this case, refers to code that is not intended or expected to execute in the process space of a particular program. It is typically written by a hacker to get into the process space of a program to accomplish some end, such as to delete, corrupt, or manipulate code or data for some other purpose, like unlawfully making unauthorized copies of music.

Preventing such attacks by foreign code assists in assuring the behavioral integrity of a computer system (or, at least, a particular program). One way to maintain integrity is to perform module authentication, in which the security of one or more software modules is protected against tampering. This provides a level of protection against malicious changes to the software such as code patching, redirection, and software breakpoints.

One form of module authentication is to ensure that content contained in the software module is unchanged (or, at least, that the portions of the module that are not expected to change, such as the code portions, actually remain unchanged). This may be done via static module authentication. Static module authentication is the process of verifying the persistently stored image of the module, which in some cases can be thought of as the "on-disk" module. For example, one mechanism to check the module on-disk may be accomplished by hashing the file and comparing the resulting hash value with a pre-computed hash value of the file that has been signed by a trusted signatory.

The process of hashing, is a well-known cryptographic technique for identifying data with a relatively unique, but substantially smaller representation than the original data. A good hashing algorithm, like SHA-1, will produce significantly different hash values even for minute changes in the source data, or binary file in this case. Thus, when the expected attack is modification of the stored code, hashing is very effective at allowing the modification to be detected.

There is, however, a fundamental limitation on checking the integrity and security of code and data. Simply put, all the code and data cannot be checked all the time. From a performance point of view, users may not want a computer system to dedicate an inordinate amount of its resources to constantly search for code or data tampering. For example, a big software program like Microsoft Suite is dozens of megabytes in size and would take substantial resources to repeatedly check the entire program for evidence of code or data tampering.

One way to address this performance issue is to check for foreign code by selecting some number of random pages in memory and then scan them. These pages can be scanned at some set intervals of time or occurrence of events. By checking a limited amount of code and data randomly, more resources are freed up for the user to use while at the same time providing reasonable checks against breach of computer system integrity by foreign code.

However, an improved way to check for attacks on a computer system is to carefully select what portions of the program to audit for possible tampering. For instance, if code is not referred to, then it cannot be executed, which means that it does not pose a risk to computer system integrity. Thus, it would be advantageous to provide for smart techniques to detect foreign code, where code that is about to be executed, or that has a significant possibility of being executed, is examined and verified. Specifically, it would be advantageous to determine the presence of foreign code by examining the thread stacks in a process space that may refer to any foreign code. Additionally, it would be advantageous to check the code the instruction pointer is pointing to, the page fault history, and any pointers and their associated functions that might execute, such as pointers and functions throughout the dynamic link libraries (DDLs), pointers and functions of event handlers, etc.

SUMMARY OF THE INVENTION

The present invention in its various aspects teaches an intelligent way to detect foreign code. The focus in one aspect of the invention is on code that is likely to run, that is, code that is somehow referred to. In one aspect of the invention, code that is referred to by thread stacks is examined, whether the thread stacks are active or not. In particular, selected pages of code that are referred to on any given thread stack are examined. Moreover, in another aspect of the invention, any nearby suspicious pages to those selected pages are also selected for foreign code examination. In yet another aspect of the invention, random pages referred to on thread stacks are examined.

In other aspects of the invention, pages pointed to by a processor's instruction pointer are examined for foreign code. Yet in other aspects of the invention, the page fault history is examined, which allows for the checking of any pages that are paged in from extended memory into physical memory, and any code that is calling for these pages to be paged in. Still in other aspects of the invention, event handling functions and pointers thereto are examined, such as exception handlers, which deal with events that may be brought on either a user of a computer system, the computer system itself, or both. All these aspects have in common the notion that code that is likely to execute is examined, as opposed to code that is not likely to execute, which is not examined.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, exemplary embodiments are shown depicting various aspects of the invention. However, the invention is not limited to the specific systems and methods disclosed. The following figures are included.

DETAILED DESCRIPTION OF ILLUSTRATIVE EMBODIMENTS

Overview

At first, an exemplary computing environment is described below for various aspects of the present invention. Second, these aspects are discussed in detail. For example, a method of detecting foreign code is discussed where an authentication module walks up a stack and examines whatever pages in the memory that are referenced by the stack. In the alternative, the authentication module checks for random pages and nearby suspicious pages to the pages referenced by the stack.

Additionally, the page referenced by the instruction pointer is checked, as are any pages that are referenced by event handling functionalities, whether user invoked, system invoked, or both. Moreover, the page fault history is checked for pages being paged into the physical memory and the code requesting the page-in of those pages. These are but a few of the examples that are meant to illustrate the broad principle running throughout the various aspects of this invention: code that is likely to run is checked, and code that is not likely to run is not checked.

Exemplary Computing Environment

Figure 1:
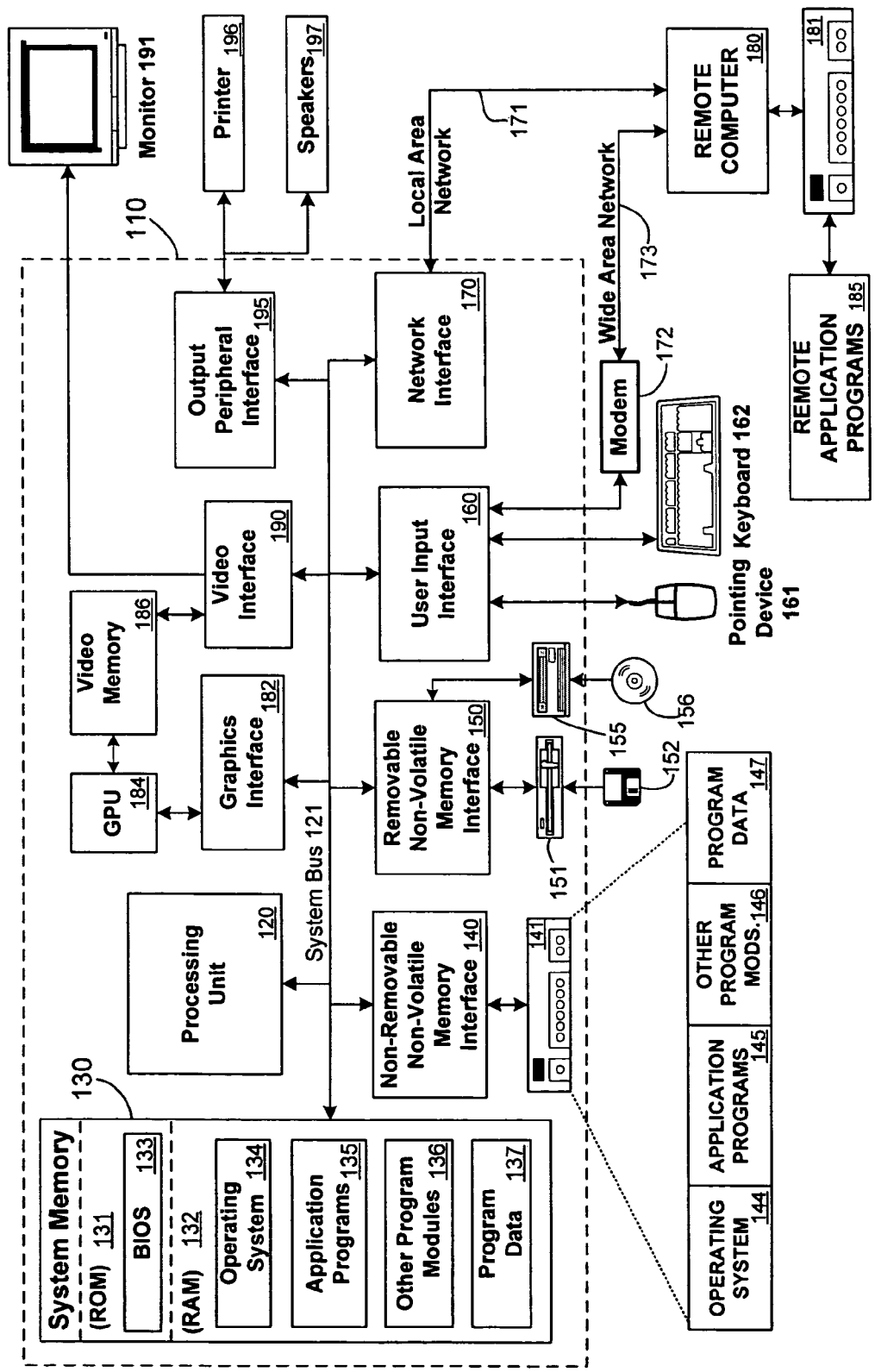
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs i35, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Aspects of Foreign Code Detection

Figure 2:
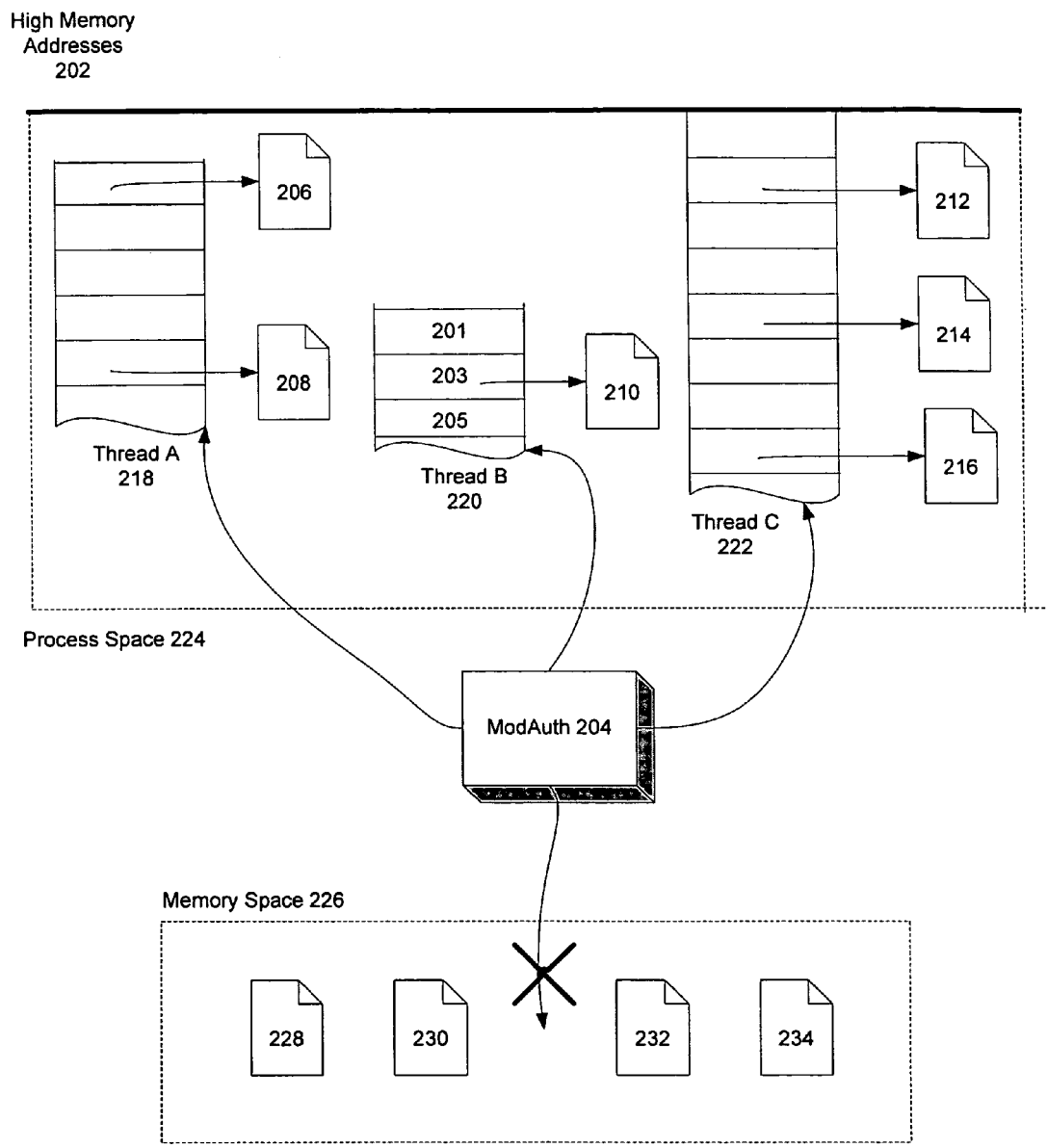
FIG. 2 illustrates the foreign code detection candidates, namely, several thread stacks located in a process space.

Aspects of the present invention discussed below check for the presence of foreign code in a process space. Specifically, code that will execute or is likely to execute is targeted to be examined. FIG. 2 illustrates some of the candidates for foreign code detection 200. Typically, code, such as executables and supported libraries are mapped into a process space. A process space does not execute, rather it just defines the memory boundaries, resources, and the like which are accessible by anything operating within that process space. A thread is an instance of execution that operates within the boundaries of a process space. There may be many threads executing in the one process space, and generally all memory and resources created in a process space can be used by any executing thread within that process space.

Typically, each thread has its own stack, and such a stack may be referred to as a "thread stack." In one aspect of the invention, FIG. 2 depicts three such thread stacks 218, 220, and 222 assigned within a process space 224, and these thread stacks are the candidates for foreign code detection, because they may reference code that is likely to run. An authentication module such as the ModAuth 204 checks for presence of foreign code within the pages to be executed referenced by each thread stack. For example, the ModAuth 204 checks thread stack A's 218 pages 206 and 208 to see if they contain any foreign code. It does the same for thread stack B 210, checking its page 210 and for thread stack C 222, checking its pages 212, 214, and 216.

What the ModAuth 204 tries to stay away from (as is illustrated with the bold "X") is the checking of other memory space (process space) 226 that contains pages 228, 230, 232, and 234. Since the memory space 226 is not part of the process space 224, its contents 228, 230, 232, and 234 will not be executed, so the ModAuth 204 does not need to check this memory space 226 for any foreign code. In short, the ModAuth 204 checks such code that might be potentially executed. In FIG. 2, the ModAuth 204 would confine its search for any foreign code to the process space's 224 thread stacks 218, 220, and 222. Such smart foreign code checking results in vastly improved computer performance, since a processor need not waste valuable clock cycles examining code that will not be executed.

Figure 3A:
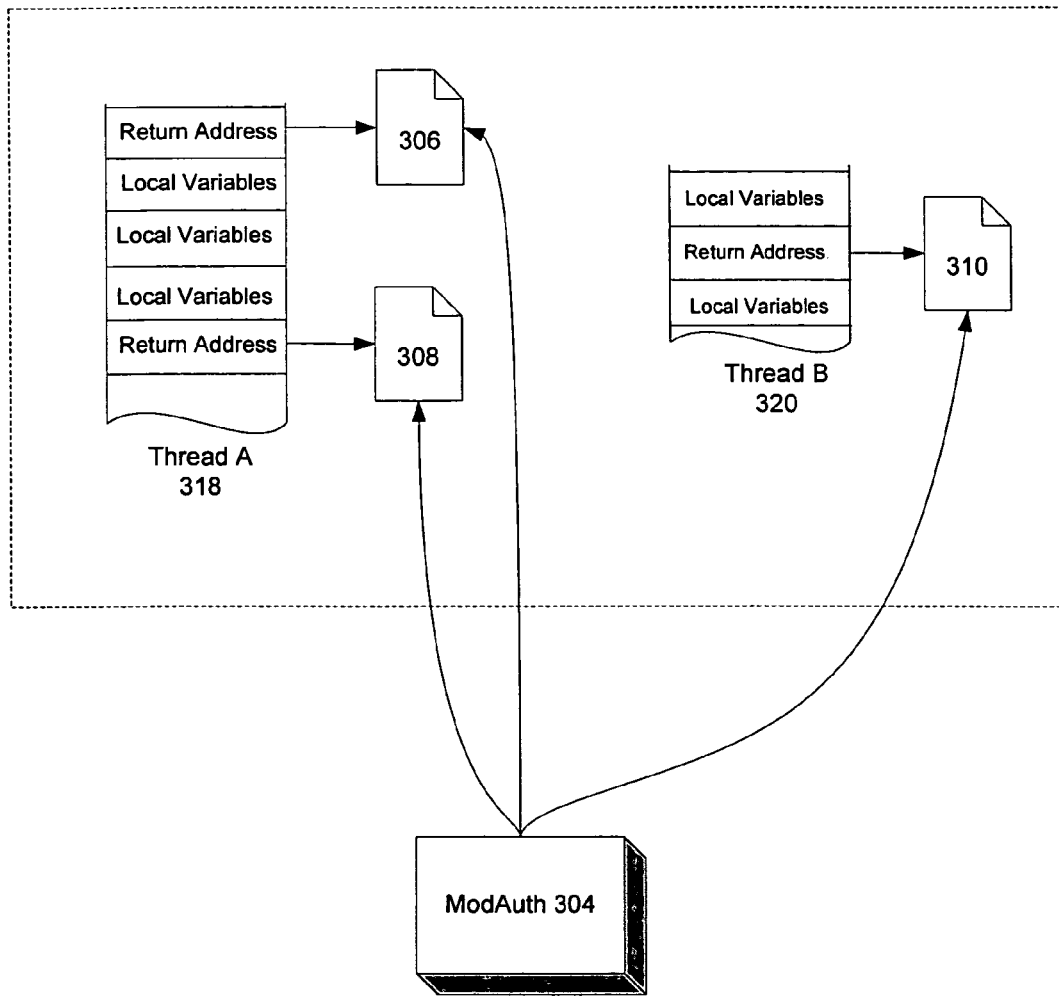
FIG. 3A illustrates the notion of walking up a thread stack and checking pages for foreign code.

In another aspect of the invention, FIG. 3A illustrates that an authentication module, the ModAuth 304, walks up thread stacks in order obtain return addresses which may reference foreign code in pages 306, 308, or 310. Likewise, any code to be executed referenced on the stack in any way that might eventually lead to the execution of foreign code is worth examining by the ModAuth 304. Stack walking is just one means to obtain reference to foreign code, namely, via the return addresses on the stack, but other techniques may be employed which find reference to code that might execute.

The notion of stack walking is known in the art, especially when used at the debugging stage. At this stage, stack walking is accomplished with the aid of debug symbols that provide information about stack frames (also referred to as activation records) and their sizes so that reliable stack walking can be performed. In one aspect of the invention, the ModAuth 304 walks up the tread stacks. Specifically, the ModAuth 304 walks up the frames (not shown) of thread stack A 318, going through the local variables and return addresses referencing pages 306 and 308 of code to be executed. It does the same for thread stack B, which contains a return address that references page 310. And so, the ModAuth 304 can examine all thread stacks in the entire process space 324.

Figure 3B:
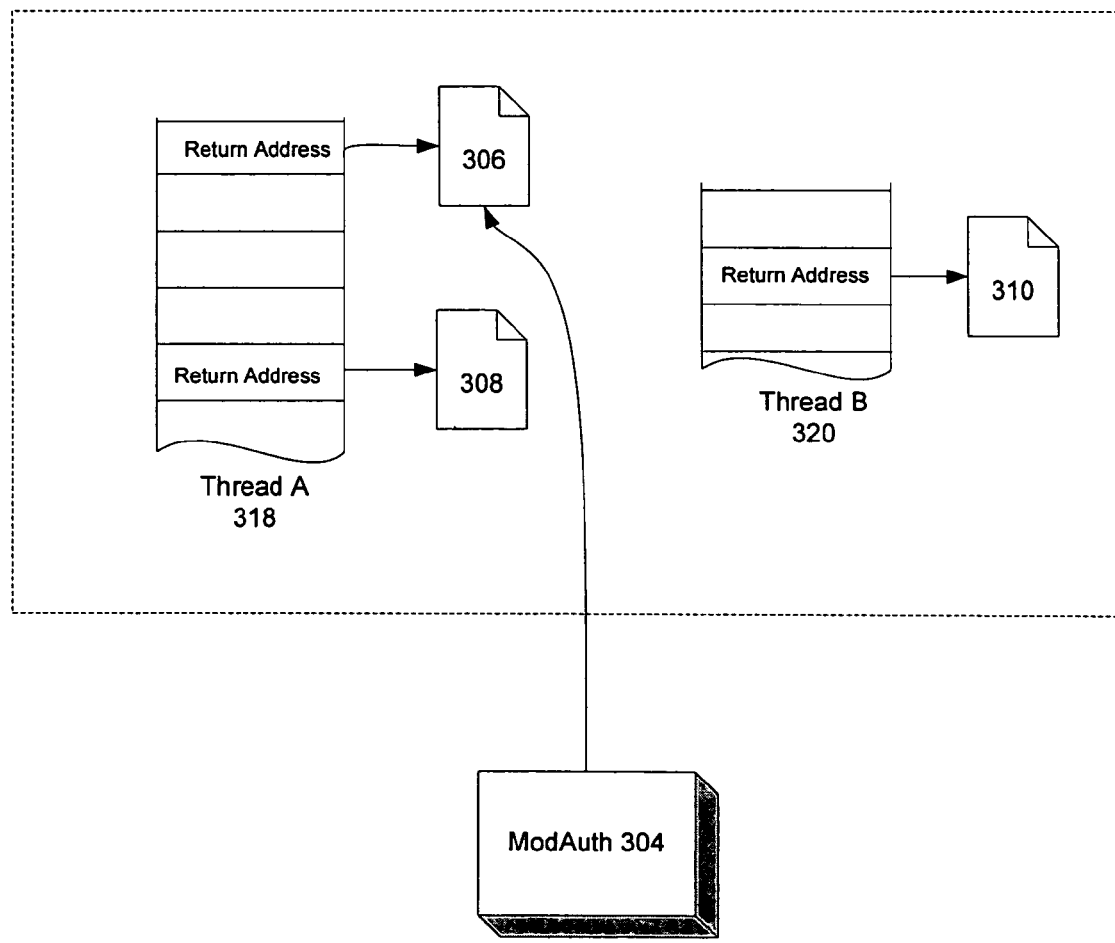
FIG. 3B illustrates the notion checking random pages referenced by thread stacks.

In FIG. 3B, in another aspect of the invention, the ModAuth 304 checks random pages referenced by the thread stacks of the process space 324. Specifically, ModAuth 304 checks page 306 but does not necessarily check page 308 in thread stack A 318, and it does not check page 310 in thread stack B 320. The checking of random pages can be done every specified period of time or several times in a specified time interval. The checking implementation is tied to the performance of a system running the ModAuth 304 functionality. In other words, the more often and more pages that the ModAuth 304 has to authenticate for the absence of foreign code, the more the system will decrease its performance, since more computing resources will have to be dedicated to the detection of foreign code.

Figure 3C:
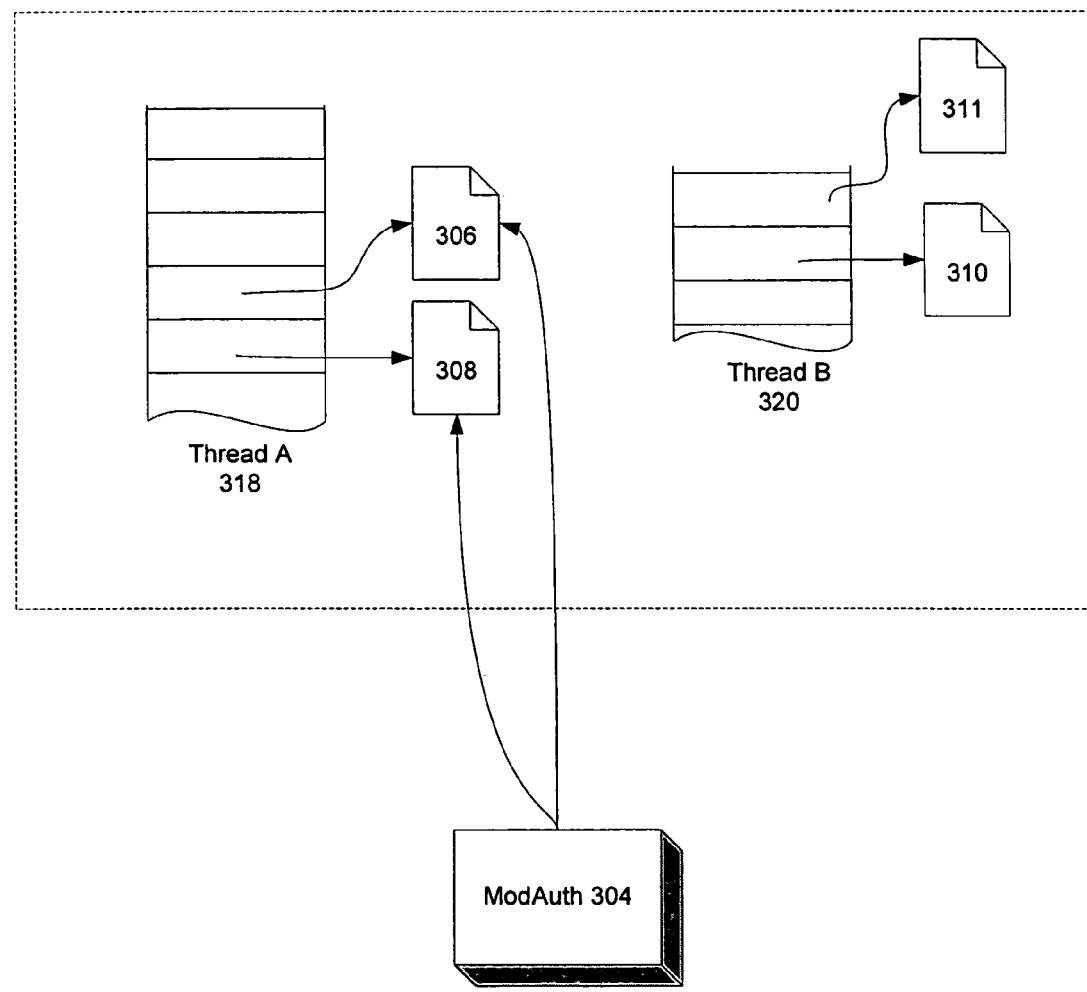
FIG. 3C illustrates the notion of checking nearby suspicious pages for foreign code.

In FIG. 3C, in yet another aspect of the invention, the ModAuth 304 checks not only selected pages but also any suspicious pages that are nearby to the selected pages. For example, if the ModAuth 304 has selected to check page 308 in thread stack A 318, then it might also want to check the page that will be executed next, namely, page 306. Likewise, if ModAuth 304 has selected to check page 310 in thread stack B 320, then it might also want to check the next page, namely, page 311. The selected page may be selected randomly or not. In either case, the next or the previous, or any nearby page can be checked to that of the selected page.

Figure 4:
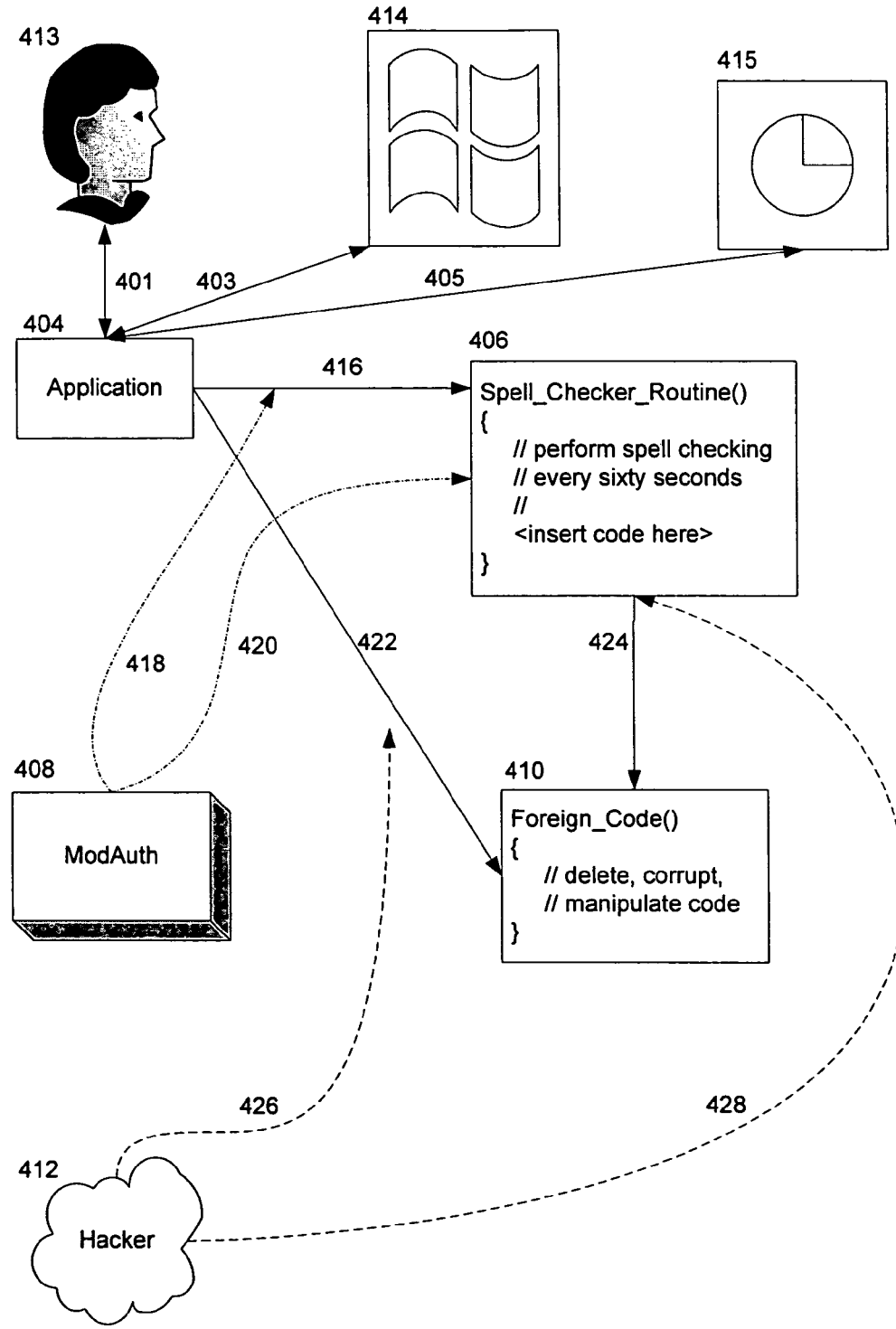
FIG. 4 illustrates the checking of event handling functions and pointers for the presence of foreign code.

In another aspect of the invention, FIG. 4 illustrates that event handler functions, and pointers to those functions, may be examined for foreign code, where the functions are typical computer system event handler functions. One example of an event handler is a function or method that is executed in response to an event. An event can include (1) user actions, such as keystrokes and mouse movements, (2) system occurrences, such as running out of memory (e.g., an exception handler function), or (3) a hybrid of these two, such turning on a spell checker by a user and updating a spell check every minute by the system. A reason that it is advantageous to check the integrity of these functions is that they could be called upon to execute at any time, and thus fall into the category of "code that is likely to execute." Typical event handlers include the following functions but are not limited to these examples:

onclick (handles an event that occurs when the user clicks an element)
ondblclick (handles an event that occurs when the user double-clicks an element)
onkeydown (handles an event that occurs when a key is pressed down)
onkeypress (handles an event that occurs when the user presses an alphanumeric key)
onkeyup (handles an event that occurs when a key is released)
onmousemove (handles an event that occurs when the user moves the mouse pointer while it is over an element)
onmouseout Handles an event that occurs when the user moves the pointer off the element.

These are just few of the numerous event handling functions can be guarded against foreign code to improve the behavioral integrity of a program.

In FIG. 4, three types of events are illustrated: a user 413 can create an event by keystroke or mouse movements 401, a windows system 414 procedure can occur 403, or a timer routine 415 can be implemented by a user and updated 505 by the system. These events are processed by some application 404 that is running and that has pointers to functions to handle these events. For example, upon a timer routine 415 event, the application 404 processes the event and invokes via a pointer 416 to the Spell_Checker_Routine( ) 406. This routine 406 may perform spell checking every sixty seconds.

The ModAuth 408 guards against any foreign code infiltration by examining 418 pointers 416 pointing to event handling functions like the Spell_Checker_Routine( ) 406 and examining 420 any infiltration by the foreign code of the routine 406 itself, i.e., examining the page containing the routine 406. In other words, a hacker 412 might change 426 the pointer 416 to an intended routine, in the illustrated example, the Spell_Checker_Routine( ) 406, so that the pointer 416 would point to 422 to some foreign code 410 and no longer to the intended routine 406. Likewise, the hacker 412 might hack 428 the intended routine 406 so that this routine 406 refers to 424 some foreign code 410, or alternatively, the hacker 412 might insert some foreign code in the routine itself 406. The ModAuth 408 must guard against such hacking scenarios if it is to protect the integrity of system code. The reason it guards against these scenarios is because event handling code will run in response to particular events that are likely to occur. The ModAuth 408 is not directed to verify code that will not run, but rather code that will run or is likely to run since such code might potentially invoke foreign code.

Figure 5:
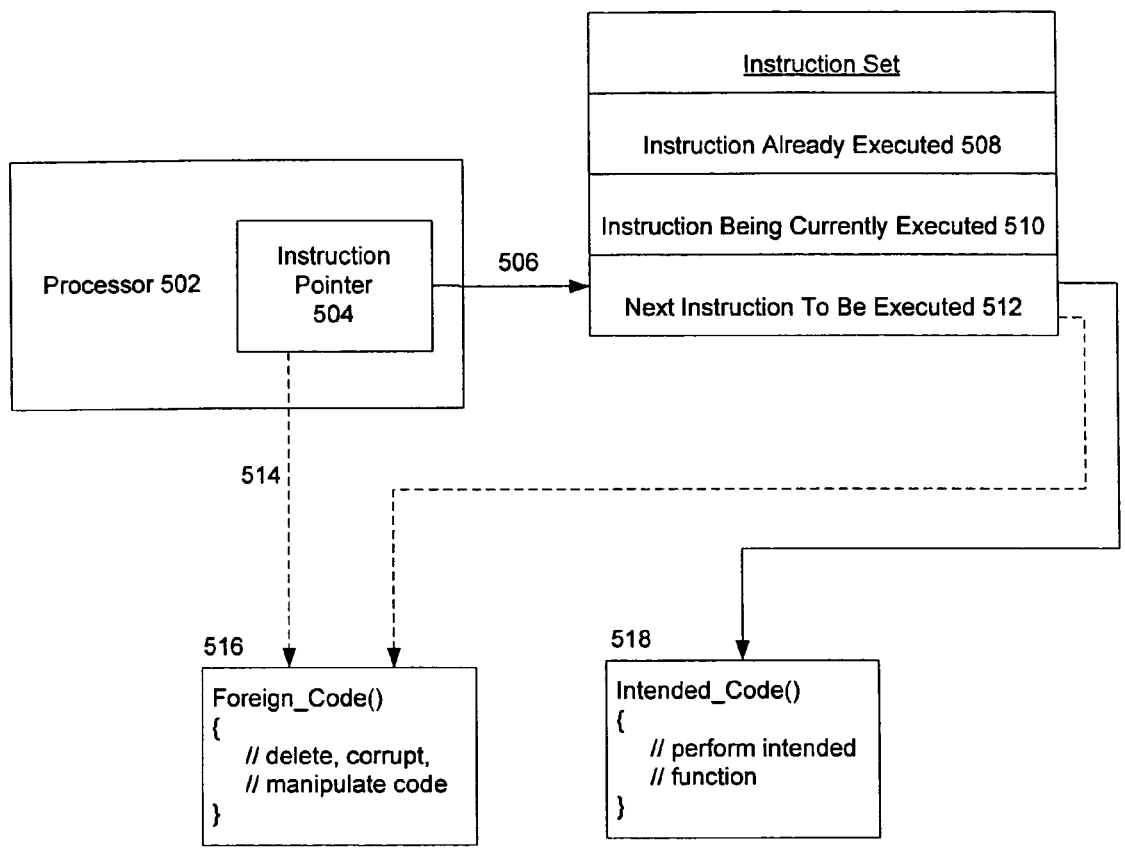
FIG. 5 illustrates the checking of the instruction pointer for foreign code.

In another aspect of the invention, FIG. 5 illustrates checking of the instruction pointer (or program counter) of a computer system and the code it is pointing to. The instruction pointer 504 is a register that points 506 to the next instruction to be loaded from memory and then executed 512. The instruction pointer 504 is typically stored on a processor 502.

An authentication module (not shown) can check whether the instruction pointer 504 has been overwritten to point 514 to some foreign code 516, or whether it is pointing 506 to the next instruction to be executed 512 but that instruction is really some foreign code 516 and not the intended code 518. Since the instruction pointer 506 points to instructions that will be executed, is a desirable to check if foreign code might be executed via the instruction pointer.

Checking event handling functions, and instruction pointer referenced code are just but a couple of examples of the kind of code that needs to be checked, i.e., code that is likely to run. The same holds true for code that includes dynamic link libraries, subsystem procedures (e.g. those procedures responsible for windowing), and the like. Those skilled in the art will appreciate the checking of this kind of code that is likely to run, whether the standard for examining the code (store on pages) is based on event handling, instruction pointing, dynamic link libraries, windows subsystem, and the like.

Examining Page Fault History

A page fault is an interrupt that occurs when a program requests code or data that is not currently in physical memory. The interrupt triggers the operating system to fetch the code or data from some external memory, like a disk drive, and load it into the physical memory, such as RAM. This situation is to be distinguished from an invalid page fault or page fault error, which occurs when the operating system cannot find the code or data in virtual memory that comprises of the physical memory and at least some part of external memory. This usually happens when the virtual memory area, or the table that maps virtual addresses to real addresses, has become corrupt.

When a page fault occurs, a history of it and all other page faults is created. This history contains information regarding which page got paged into the physical memory and what code requested that a particular page be paged in. When a page is paged into physical memory, there is a great chance that code in the page will be executed. Therefore, checking the page fault history is an efficient way to look for potential foreign code, since code in the pages and the code requesting the pages might be executed and might also be foreign code or at least contain some foreign code.

Figure 6:
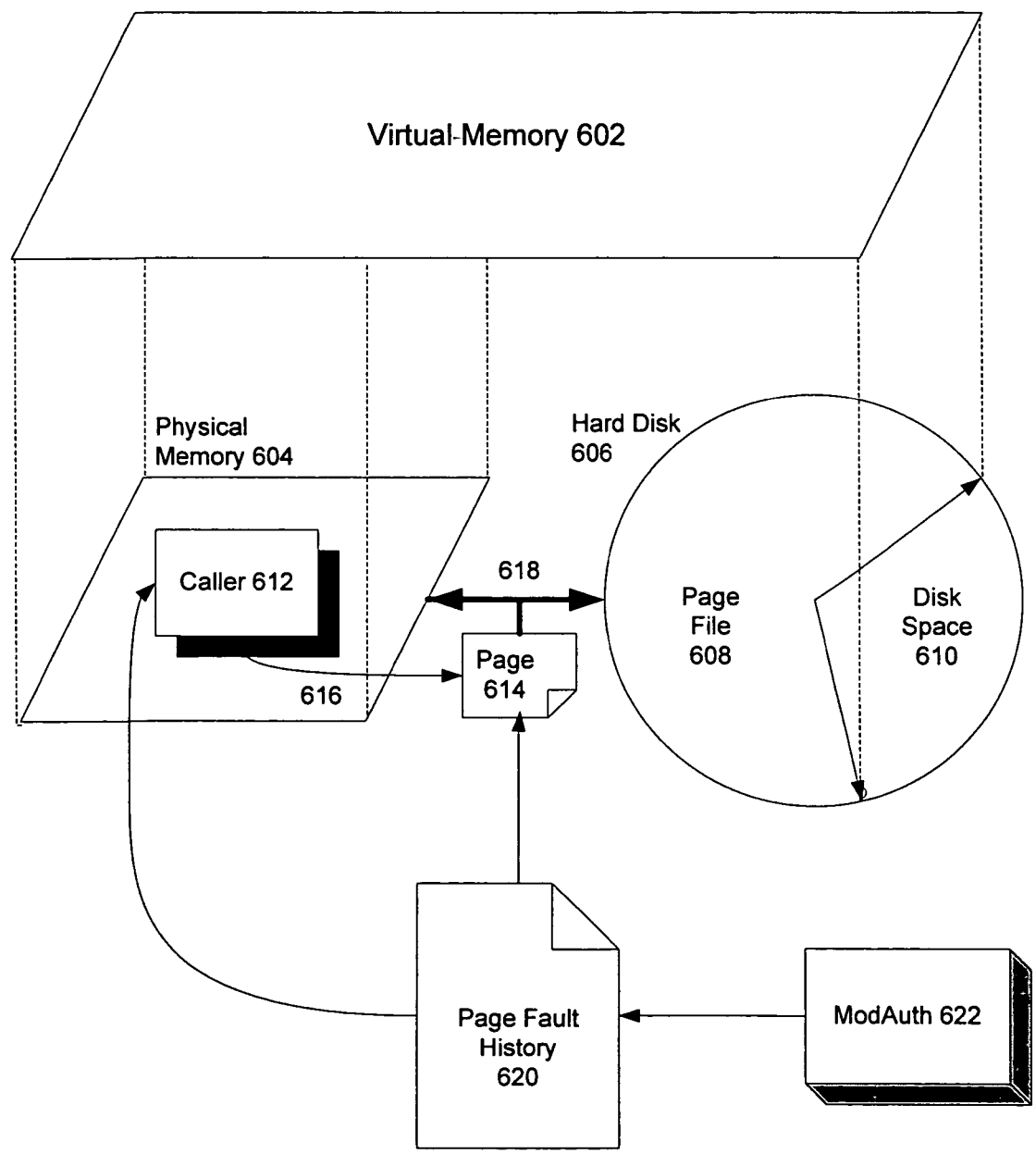
FIG. 6 illustrates the checking of the page fault history for foreign code.

FIG. 6 illustrates checking the page fault history 600. Virtual memory 602 is a way to expand the physical memory 604. This expansion is done with the help of a hard disk 606. By swapping 618 pages 614 between the physical memory 604 and the hard disk 606, it appears to a program that the physical memory 604 is bigger than it actually is, namely, that its size is that of the virtual memory 602. The virtual memory 602 is the sum total of the physical memory 604 and the page file 608 of the hard disk 606. Thus, the hard disk 606 can contain a separate disk space 610 partitioned off from use by the virtual memory 602.

A page fault history 620 maintains records of what pages 614 are paged into the physical memory 604, and which caller 612 requested 616 that a particular page 614 be paged in. By examining the page fault history 620, an authentication module ModAuth 622 can know which pages in physical memory 604 to examine. Likewise, based on the page fault history 620, the ModAuth 622 can know which code requested that a particular page be paged in.

As mentioned above, the reason the ModAuth 622 would want to check a paged-in page is that there is a great likelihood that it will be executed. Moreover, by examining the page fault history 620, the ModAuth 622 can also examine the caller 612 that requested the page 614. If the caller 612 is some foreign code that is not intended to reside in the physical memory, there is a chance that it is paging in some other foreign or malicious code.

Exemplary Implementation of An Aspect of the Invention

Figure 7:
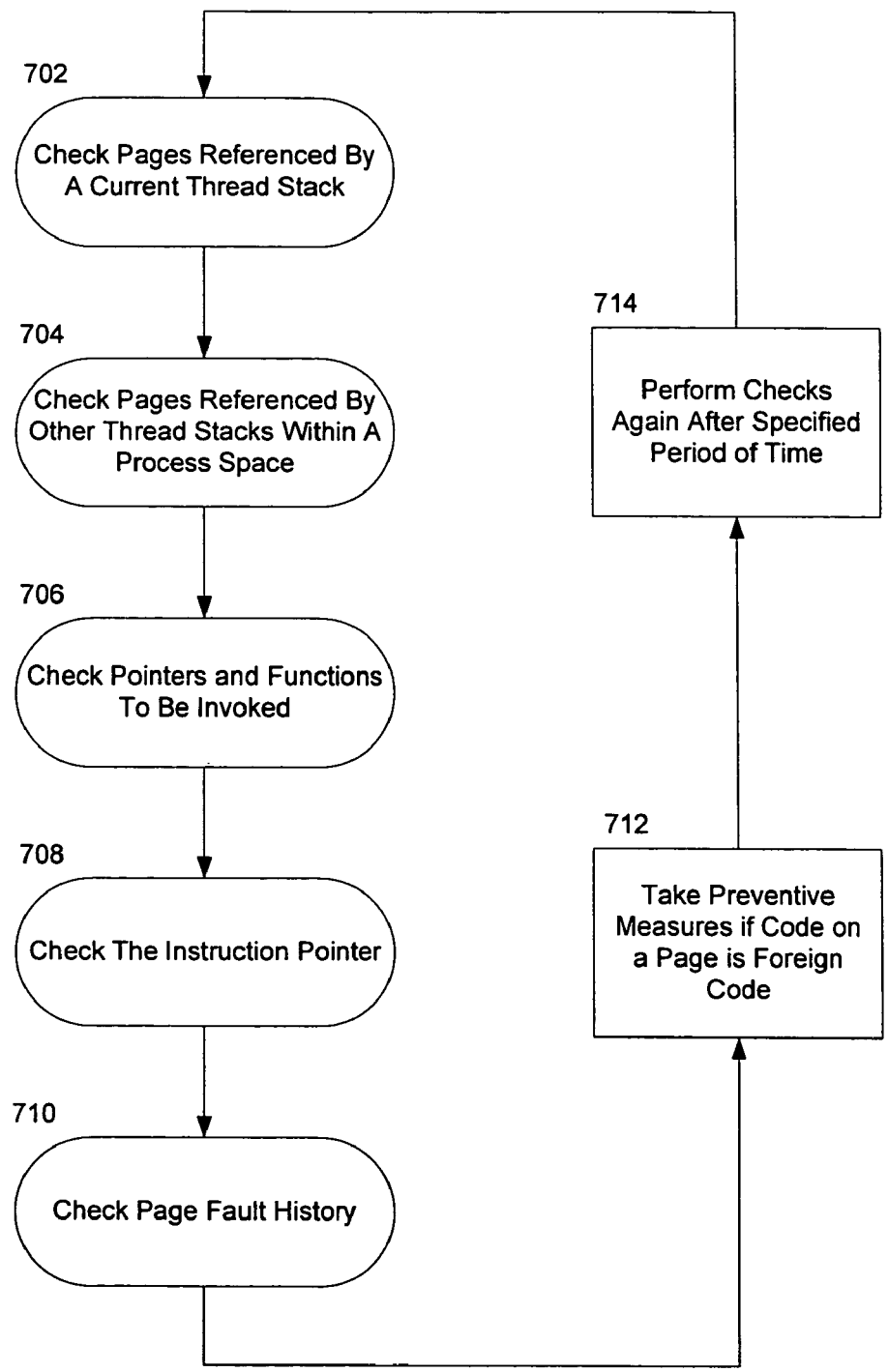
FIG. 7 illustrates an exemplary implementation of foreign code checking.

In FIG. 7, an exemplary implementation of an aspect of the invention is illustrated. Specifically, at block 702, an authentication module checks pages referenced by a current thread stack. Code on such pages will be executed or is likely to be executed, therefore checking it is important to prevent foreign code infiltration.

Next, at block 704, the authentication module checks pages referenced by other thread stacks within a process space, since upon any context switch any one of these other thread stacks might be invoked and the code referenced on them will be, or at least can be, executed.

Also, at block 706, any functions and pointers thereto that might be invoked are checked. These function might be event handling functions that are invoked based on some user event, computer system event, or a combination thereof. Since event handling functions might be invoked upon a specified event, it is important to check these functions for foreign code infiltration. Put another way, it is important to check the pages on which these functions reside.

At block 708, the instruction pointer is checked. Since this pointer points to code that will be executed following currently executing instructions, it is important to check and see whether the instruction pointer either points to foreign code because it has been hacked or whether it points to the correct set of instructions which may have been hacked and in turn contain foreign code (that then may reference further foreign code, etc.).

At block 710, the page fault history is examined. Pages that are paged in from a page file on a hard disk into physical memory are pages that will likely run and are therefore checked for foreign code. Moreover, any calling code that requested these page to be paged in is also checked. Such calling code might be foreign code that is invoking more foreign code.

At block 712, this aspect of the invention performs at least one action to prevent code from executing if such code is deemed foreign code. Such action can include causing a system fault at some random point in time, causing a process to be terminated and unloaded from memory, signaling another process to terminate or change behavior, or triggering a user interface to be displayed.

At block 714, the exemplary implementation performs checks again after some specified period of time. That time period could repeat in length for each iteration of checking or it could be arbitrary. This much is a performance consideration since the more often an authentication module has to check for foreign code the slower a system hosting the module will be. Moreover, such a foreign code detection module does not have to check all the code that will run or that might potentially run, rather it can only check several pages of any executable code or code that might be invoked.

While the present invention has been described in connection with the preferred aspects, as illustrated in the various figures, it is understood that other similar aspects may be used or modifications and additions may be made to the described aspects for performing the same function of the present invention without deviating therefrom. For example, foreign code detection was described, where code that will run or is likely to run is examined for the presence of foreign code. One example of such foreign code detection included examining current stack threads in a given process space referencing pages with code; other examples included checking random pages and nearby pages. However, other equivalent methods to these described aspects are also contemplated by the teachings herein. Therefore, the present invention should not be limited to any single aspect, but rather construed in breadth and scope in accordance with the appended claims.

What is claimed is:

1. A method of detecting an attempt to execute foreign code, comprising: identifying a page of memory that contains code, based on a standard as to the likelihood that the code contained in the page will be executed, wherein the standard is a page fault history that identifies the page as being paged-in to physical memory and calling code invoking the page to be paged-in; verifying that the code satisfies an integrity test; taking at least one action to prevent the code from executing, if the code does not satisfy the integrity test, wherein: identifying the page comprises reviewing the page fault history, the page fault history being a record of each page paged into the physical memory and also the calling code which requested the paged-in page, to identify the paged-in page and the calling code thereof, verifying the code comprises applying the integrity test to the code contained in the paged-in page, and also to the calling code which requested the paged-in page, and applying the integrity test comprises determining that the calling code is not foreign code that is not intended to reside in the physical memory, and examining computer system event handler functions and pointers to the event handler functions for foreign code, each event handler function being executed in response to an event arising from at least one of user actions or system occurrences, the examining of each event handler function comprising: examining each pointer pointing to the event handler function to determine that the pointer in fact points to the event handler function and not elsewhere; examining for any infiltration by foreign code of the event handler function; and examining the event handler function for any modification thereof referring to foreign code.

2. The method according to claim 1, wherein the standard is a thread stack that references the page.

3. The method according to claim 2, wherein the page is randomly selected.

4. The method according to claim 2, further comprising an additional page referenced by the thread stack, wherein the additional page is at least a next page or at least a previous page to the page, wherein the additional page is identified based on the standard, and verified by the integrity test, and subject to preventive action if the code on the additional page does not satisfy the integrity test.

5. The method according to claim 1, wherein the standard includes event handling code, wherein the event handling code can be invoked based on any one of user events, computer system events, or a combination thereof.

6. The method according to claim 1, wherein the standard includes pages referenced by an instruction pointer.

7. The method according to claim 1, wherein the standard includes pages containing dynamic link library functions.

8. The method according to claim 1, wherein the integrity test includes checking whether the hash of the page matches a stored hash.

9. The method according to claim 1, wherein the at least one action to prevent the code from executing is one of causing a system fault at some random point in time, causing a process to be terminated and unloaded from memory, signaling another process to terminate or change behavior, and triggering a user interface to be displayed.

10. A system for detecting an attempt to execute foreign code, comprising:
    a code, wherein the code contains computer executable instructions;
    a page of memory, wherein the code resides on the page, wherein the page resides in a process space of a computer system;
    an authentication module, wherein the authentication module identifies the page based on a standard as to the likelihood that the code contained in the page will be executed; wherein:
        the authentication module verifies that the code satisfies an integrity test;
        the authentication module takes at least one action to prevent the code from executing, if the code does not satisfy the integrity test; and
        the standard includes examining an instruction pointer address and contents resident at the pointer address, and wherein the standard includes examining at least one pointer to a dynamic link library and the contents of the dynamic link library, wherein the standard includes examining a combination of random memory pages and adjacent pages to the page of memory, and wherein the standard includes a page fault history that identifies the page as being paged-in to physical memory and calling code invoking the page to be paged-in,
        identifying the page comprises reviewing the page fault history, the page fault history being a record of each page paged into the physical memory and also the calling code which requested the paged-in page, to identify the paged-in page and the calling code thereof,
        verifying the code comprises applying the integrity test to the code contained in the paged-in page, and also to the calling code which requested the paged-in page, and
        applying the integrity test comprises determining that the calling code is not foreign code that is not intended to reside in the physical memory, and
    the authentication module examining computer system event handler functions and pointers to the event handler functions for foreign code, each event handler function being executed in response to an event arising from at least one of user actions or system occurrences, the examining of each event handler function comprising:
        examining each pointer pointing to the event handler function to determine that the pointer in fact points to the event handler function and not elsewhere;
        examining for any infiltration by foreign code of the event handler function; and examining the event handler function for any modification thereof referring to foreign code.

11. The system according to claim 10, wherein the standard is a thread stack that references the page.

12. The system according to claim 11, further comprising an additional page referenced by the thread stack, wherein the additional page is at least a next page or at least a previous page to the page, wherein the additional page is identified based on the standard, and verified by the integrity test, and subject to preventive action if the code on the additional page does not satisfy the integrity test.

13. The system according to claim 10, wherein the standard is a page fault history that identifies the page as being paged-in to physical memory and any calling code invoking the page to be paged-in.

14. The system according to claim 10, wherein the standard includes event handling code, wherein the event handling code can be invoked based on any one of user events, computer system events, or a combination thereof.

15. The system according to claim 10, wherein the integrity test includes checking whether the hash of the page matches a stored hash.

16. The system according to claim 10, wherein the at least one action to prevent the code from executing is one of causing a system fault at some random point in time, causing a process to be terminated and unloaded from memory, signaling another process to terminate or change behavior, and triggering a user interface to be displayed.

17. A computer readable medium storing thereon computer executable instructions configured to detect foreign code, comprising:

an instruction configured to examine at least one instruction pointer address and contents resident at the pointer address; an instruction configured to examine at least one pointer to a dynamic link library and the contents of the dynamic link library; an instruction configured to examine at least one event handler function and any pointers to the event handler function; an instruction configured to examine a page fault history, including any pages that have been paged between a physical memory and a hard disk, and including any code that has invoked any pages to be paged between the physical memory and the hard disk; and an instruction configured to govern any examining instructions based on a combination of random memory pages and adjacent memory pages, and at specified periods of time or several times in a specified time interval;

wherein the instruction configured to govern any examining instructions is confined to govern a designated process space that excludes at least one memory space in a computing environment, wherein the page fault history is a record of each page paged into the physical memory and also the calling code which requested the paged-in page, wherein examining the page fault history includes identifying a paged-in page and the calling code thereof, and further includes applying an integrity test to code contained in the paged-in page, and also to the calling code which requested the paged-in page, and wherein applying the integrity test comprises determining that the calling code is not foreign code that is not intended to reside in the physical memory: the instruction configured to examine at least one event handler function and any pointers to the event handler function method examining computer system event handler functions and pointers to the event handler functions for foreign code, each event handler function being executed in response to an event arising from one of a user actions, a system occurrences, and a combination thereof, the examining of each event handler function comprising: examining each pointer pointing to the event handler function to determine that the pointer in fact points to the event handler function and not elsewhere; examining for any infiltration by foreign code of the event handler function; and examining the event handler function for any modification thereof referring to foreign code.

* * * * *